Figure 1:
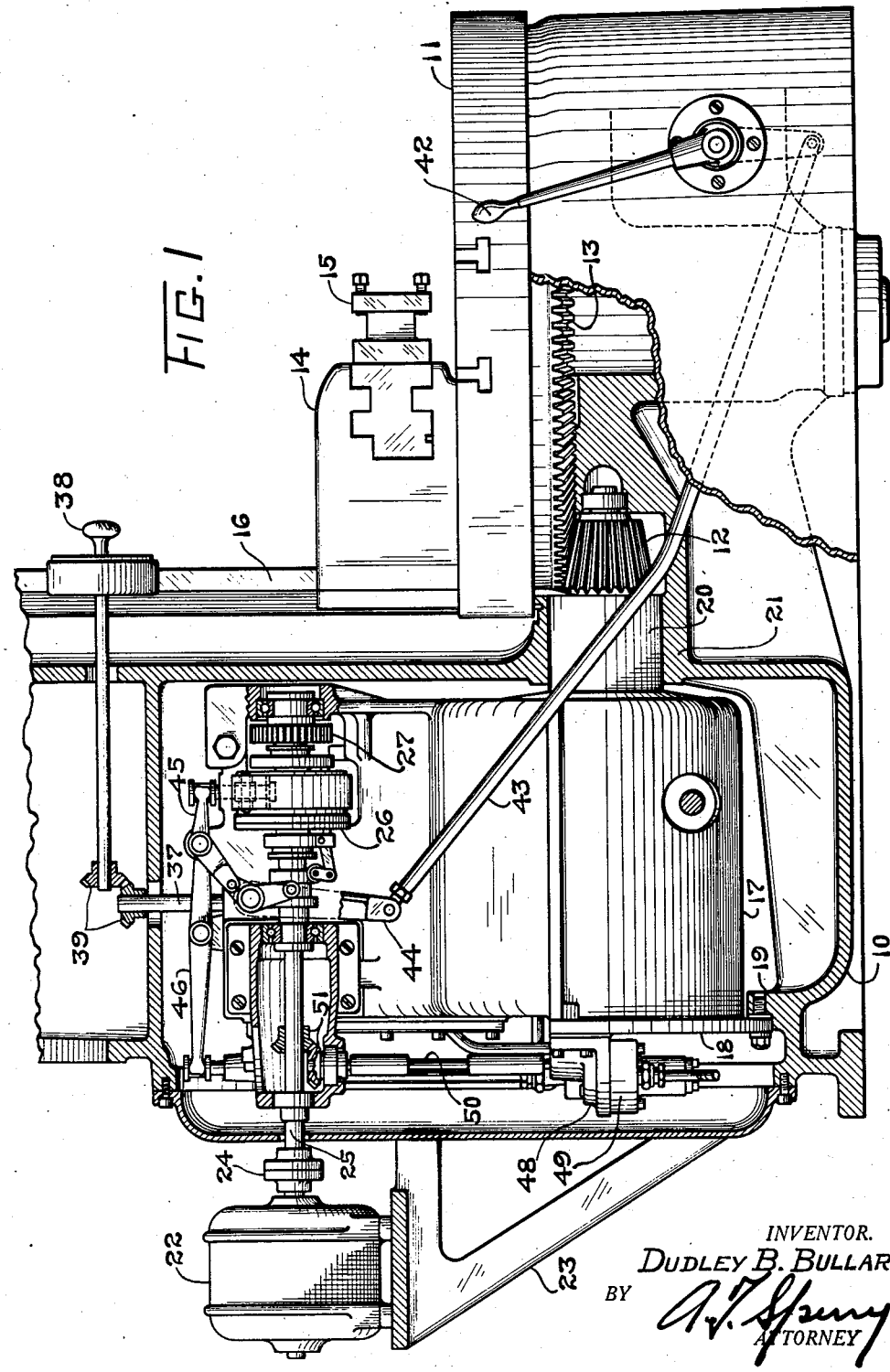

Oct. 20, 1936.  D. B. BULLARD  2,058,294

GEAR SHIFTING CONTROL MECHANISM

Filed Oct. 3, 1933  3 Sheets—Sheet 1

INVENTOR.
DUDLEY B. BULLARD
BY
ATTORNEY

Oct. 20, 1936.   D. B. BULLARD   2,058,294
GEAR SHIFTING CONTROL MECHANISM
Filed Oct. 3, 1933   3 Sheets-Sheet 2

INVENTOR.
DUDLEY B. BULLARD
BY
ATTORNEY

Oct. 20, 1936.　　　D. B. BULLARD　　　2,058,294
GEAR SHIFTING CONTROL MECHANISM
Filed Oct. 3, 1933　　　3 Sheets-Sheet 3

INVENTOR.
DUDLEY B. BULLARD
BY
ATTORNEY

Patented Oct. 20, 1936

2,058,294

UNITED STATES PATENT OFFICE 2,058,294

GEAR SHIFTING CONTROL MECHANISM

Dudley B. Bullard, Southport, Conn., assignor to The Bullard Company, a corporation of Connecticut Application October 3, 1933, Serial No. 691,958

17 Claims. (Cl. 74—334)

This invention is applicable, primarily, to the control of hydraulically-actuated speed change mechanisms.

It is among the prime objects of the invention to provide automatic means for controlling the application of fluid pressure to such mechanisms.

A further object is to provide automatic means for relieving fluid pressure on a pressure controlled selector, so as to permit the selector to be freely moved prior to its action in the control of fluid therethrough.

Another important object is to provide means for supplying fluid under pressure to the selector in response to the operation of an associated clutch mechanism.

A further and more specific object is to provide, in combination with a fluid pressure actuated gear shift mechanism, automatic means for controlling the supply of fluid under pressure to a selector in response to the actuation of an associated speed change mechanism.

The invention is more specifically designed for, and is here illustrated in combination with a fluid pressure controlled speed change mechanism designed for machine tools, as set forth in copending applications Serial Numbers 641,185 and 655,735, the specific fluid pressure control being of the type set forth in Patents #1,794,472 and #1,800,982.

While the invention is herein shown in combination with a machine tool head stock, as set forth in the prior applications above identified, and while, thus, being applicable to machine tools of the lathe, milling or drilling machine type, it will be understood, of course, that the invention is broadly applicable to change speed mechanisms, regardless of the applications to which such mechanisms are applied.

The invention is specifically concerned with means for relieving the selector from pressure during the rotation of the gears, thus, to permit free and unrestricted setting movement thereof, prior to such time as when it is desired to vary the established gear ratios. The provision of such means allows for a so-called "pre-selection". Thus, the operator may, at any time, freely set the selector so as to direct the fluid for any desired combination of gear movements, this being accomplished without precluding manual change of the setting while the machine is idling. It is also desired to provide an arrangement by which pressure will automatically be applied at the desired time, such as when the main clutch is thrown out, thus bringing the shafts of the change speed mechanism at rest.

In general, the preferred form of instrumentality for carrying out the foregoing desiderata includes a constantly running fluid pressure supply pump, which may deliver fluid under pressure through a controlled passage to the selector of a fluid-actuated gear control mechanism. Should pressure be constantly applied to the selector, it precludes a pre-selection or movement of the selector prior to such time as when it is desired to actuate the gear selection. Therefore, the controlled passage is arranged with pressure responsive means to shut off such pressure during the operation of the speed change mechanism. This is accomplished through the means of a pump, which is supplied with fluid under pressure from the constantly rotating supply means, and which forces a portion of the fluid supplied therefrom through a by-pass to hold the valve closed. The pump 57 is actuated, preferably, by the primary shaft of the speed change mechanism; thus, when such shaft is rotating, as when the main clutch is engaged, pressure is built up. Pressure is relieved through the cessation of movement of the pump in response to stopping of the primary shaft, as when the clutch is disengaged, the valve is open, thus, supplying fluid pressure to the selector, which automatically actuates the gears in accordance with a pre-selected gear ratio.

It will be understood, of course, that the above statement is a generalization of the fundamentals of the present invention, and that the invention is not confined to the specific structural means by which these functions are accomplished, as in the embodiment of the invention hereinafter described in detail.

In the drawings, Figure 1 is a side elevation of a machine tool headstock, as set forth in the applications referred to above, and embodying the present invention.

Figure 2:
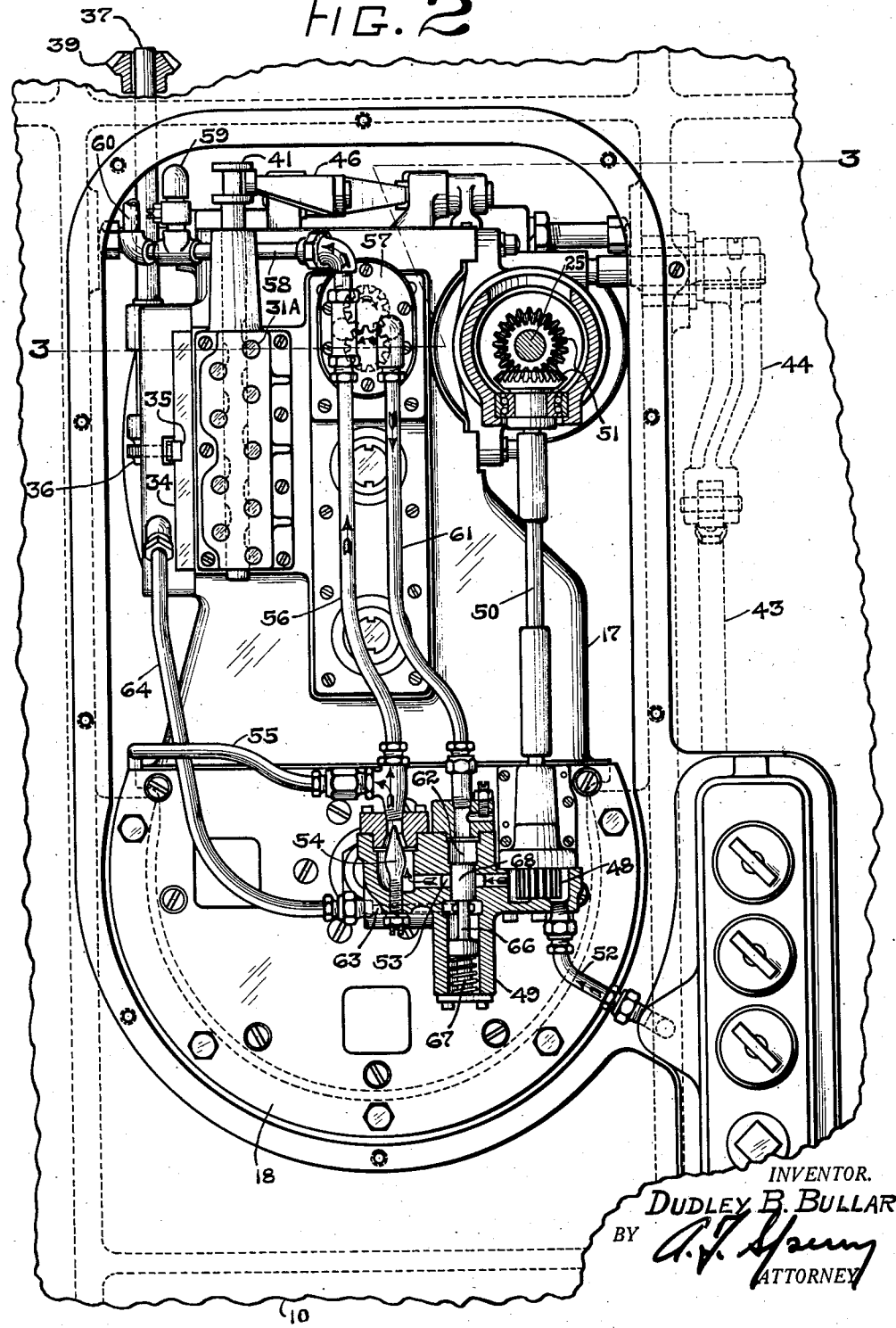
Figure 3:
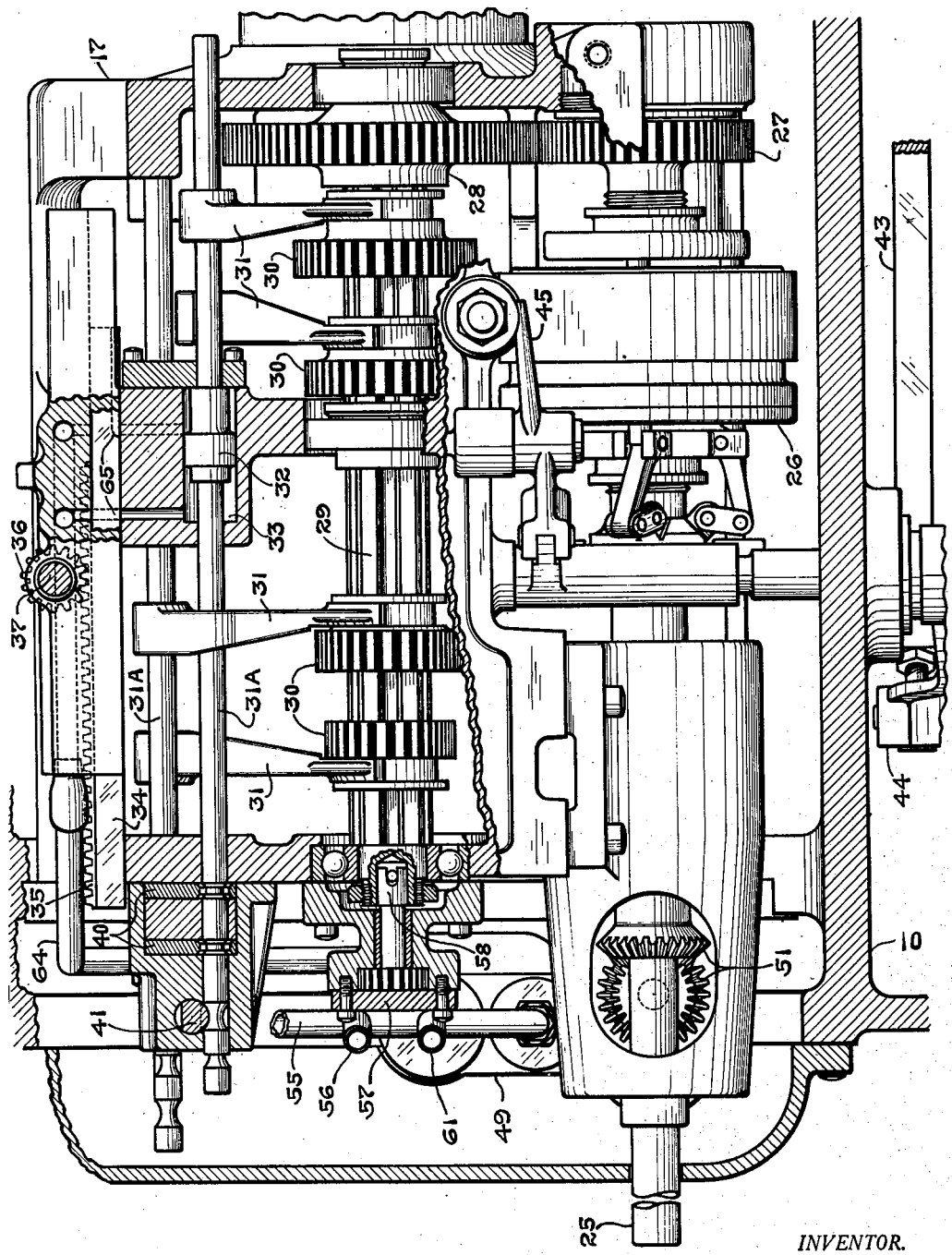

Figure 2 is a rear elevation of the headstock, showing, in section, the control valve mechanism; and Figure 3 is a top plan view, partly in section, as indicated by the line 3—3 of Figure 2.

In the drawings, the invention is shown as applied to a machine tool headstock of a lathe type of machine, the headstock being mounted within the base 10 of a single spindle machine, the work table 11 of which is adapted to be driven from the headstock through the enmeshment of the bevel pinion 12 thereof with the table gear 13. A side head 14 and tool holder therefor 15 are indicated as mounted upon front vertical ways 16. These structural features of the machine are shown, of course, merely by way of example.

The headstock includes a housing 17, which is preferably removably supported within the base as by its flange 18 with a co-operating flange 19 of the base, and through the support of its final driving shaft bearing 20 within a co-operating configuration 21 of the base. This construction and mounting of the headstock provides unit removability thereof. This feature, however, forms no part of the present invention, it being fully set forth and claimed in application Serial No. 641,185, referred to hereinbefore.

Power is supplied to the headstock through the medium of a motor 22, which may be conveniently supported upon a suitable bracket 23, and directly coupled, through a coupling 24, to a constantly running shaft 25, which leads to the main clutch, generally indicated by the numeral 26, through which drive is selectively provided for the gear 27, and hence, the primary gear 28 on the primary shaft 29 of the headstock. Since the gearing arrangement, and even the specific gear-moving mechanism, form no part of the invention, only sufficient structure is here shown as to make clear the application of the invention to a change speed mechanism.

The details of the gear arrangement of the headstock which is here shown by way of illustration are set forth in application Serial No. 655,735, while the hydraulic gear-moving mechanism is more fully set forth in Patents #1,794,472 and #1,800,982. Suffice it to say, therefore, that the headstock includes the primary shaft 29 and one or more parallel shafts, various driving ratios being maintained therebetween by various sliding gears, such as indicated by the numeral 30 in Figure 3.

A selection in speed ratio is provided by shifting of the gears through the medium of shifting arms 31, which are actuated by pistons, as indicated at 32, the admission and discharge of fluid to the cylinders 33 of which is controlled by the position of a reciprocating ported selector 34, which is provided with a rack 35, with which is enmeshed an actuating gear 36 mounted upon shaft 37. Thus, by referring to Figure 1, it will be seen that rotation of the selector control knob 38 will, through the bevel gears 39, move the selector 34 so as to be in position to control the admission to or discharge of fluid from the various cylinders 33, and thereby, to actuate the gears to set them for the desired ratio of speeds from the primary shaft 29 to the driving pinion 12. Incidentally, suitable interlocking means, including plates 40 and rod 41, may be provided to control the inter-relation of the rods 31A, the same being referred to in detail in application Serial No. 655,735, all of such mechanism being merely incidently shown, and forming no part of the present invention.

During the operation of the apparatus, power is normally supplied continuously from the motor 22 to rotate the shaft 25. Manual means, in the form of lever 42, connecting link 43 and clutch lever 44, are provided for manually actuating the clutch so as to selectively operate the gear 27 from the shaft 25. The manual clutch control means illustrated is shown as including brake operating means 45, and inter-locking lever 46, as set forth in the application referred to above.

For supplying fluid under pressure for the actuation of the gear shifting mechanism, a gear pump 48 is mounted in a suitable housing 49 at the rear of the head stock, the pump being adapted to be directly driven through the medium of a shaft 50, continuously driven from the shaft 25 through bevel gears 51. In order to avoid the necessity of separate fluid pressure pumps for the operation of the shifting mechanism, and for the lubrication of the drive, the pump 48 is utilized for drawing oil through a connection 52 from a suitable oil sump, not shown. From the pumps 48, the oil is discharged through a passage 53 in the housing 49, and therefrom past a manually adjustable pressure-controlling throttle needle 54, after which the flow is divided, a portion being delivered through the pipe 55 for lubrication purposes, and through pipe 56 to a secondary pump 57, the gears of which are directly driven from the primary shaft 29, as shown by the connection at 58 in Figure 3. From the secondary pump 57, oil flow continues through pipe 58 and branch pipes 59 and 60 for lubrication purposes, and when the pump is running, through pipe 61, to a pressure chamber 62 in the housing 49. The pressure chamber 62 communicates with the passage 53, crossing it and communicating with a valve pressure supply duct 63, which communicates, by means of pipe 64, with the selector housing, whereby, fluid under pressure is delivered to the pipe 64 and will be selectively administered to and discharged from the cylinders 33 by means of passages, as indicated at 65, in the selector 34.

Within the pressure chamber 62, a plunger 66 is mounted, and is normally urged upwardly by a spring 67. The upper end of the plunger 66 is provided with a piston head 68, the diameter of which corresponds to the upper diameter of the chamber; thus, any upward movement of the plunger must be in opposition to any pressure therein by the operation of auxiliary pump 57. When the plunger is in downward position, as shown in Figure 2, which position shows the spring 67 contracted as by the retention of the plunger in downward position through pressure within the chamber 62, the piston head 68 closes off any communication of fluid from passage 53 to the duct 63. When the pump 57 ceases operation, the spring 67 moves the plunger upwardly, admitting fluid from the passage 53 to the duct 63, thus, to apply pressure through pipe 64 to selector 34, it being seen that the diameter of the head 68 is such as to completely fill the chamber 62 below the passage 53. However, when the head is above the passage 53, free passage of fluid will be permitted.

From the foregoing, it is believed that the operation of the device will be readily understood. When the machine is first put into operation, the selector knob 38 is first rotated to bring the selector to desired position for moving or maintaining the gears 30 in desired position, to secure the desired speed ratio between the drive shaft 25 and the final drive pinion 12. The motor 22 is then energized, thus, driving the shaft 25, the clutch being out of engagement, and the brake being applied so as to maintain the gear 27 stationary. With the shaft 25 rotating, the pump 48 will be actuated, thus, delivering fluid under pressure through the passage 53, and thence, through pipes 55 and 56. Since the pump 57 is stationary by virtue of the disconnection of the clutch 26, sufficient pressure is not maintained in pipe 61 and chamber 62 to overcome the upward thrust of plunger 66, which, therefore, is in upward position, permitting the flow of fluid under pressure from passage 53 to duct 63, and thence, through pipe 64 to the selector and to the cylinders with which the selector maintains communication in that particular setting to which it has been placed.

When the gears are thus set in their desired relationship, the handle 42 controlling the clutch, its brake and its interlocking mechanism may be moved to establish drive from the shaft 25 through gear 27 to the primary shaft of the head stock. This primary shaft 29 will thus be driven, and with it, the pump 57, actuation of which will build up a pressure in the pipe 61 and chamber 62 sufficient to thrust the plunger 66 downwardly against the tension of spring 67, whereby the head 68 will completely fill the aperture between passage 53 and duct 63, thus, relieving pressure in the pipe 64 and on the selector 34. With the primary shaft 29 rotating, the selector may be freely moved, since it is not under pressure; and since fluid is not being delivered thereto, such movement will not affect the movement of any of the rods 31A or gears 30. The selector may be set thus so as to establish communication with any desired set of cylinders, and to admit fluid under pressure thereto as soon as the plunger is again raised to admit fluid under pressure through pipe 64; thus, a new setting for the selector may be brought about, but, there will be no action of the speed change mechanism until such time as the handle 42 is again moved and the clutch disengages shaft 25 from gear 27, at which time the pump 57 will again stop, pressure will be relieved in pipe 61 and chamber 62, the plunger 66 will again rise under the influence of spring 67, and since the pump 48 maintains its operation, pressure will be supplied to the valve, and the gears will be moved to correspond with the new setting of the selector 34.

Throughout the operation, as many changes in gear ratio may be brought about as desired through this means. It is important to note that, by means of this arrangement, it is not necessary that the gears be successively shifted through successive speed changes, nor is there a possibility of shifting of the gears during rotation thereof, since fluid under pressure is not supplied to the selector during rotation of the shafts of the head stock; and furthermore, the shifting of the gears will automatically and immediately take place upon disengagement of the clutch.

From the foregoing, it will be seen that the present invention provides a simple, efficient, effective and economical means for permitting pre-selection of speeds in a change speed mechanism, and for automatically shifting in response to movement of a main clutch. The invention thus provides for ease and automaticity in speed change mechanisms.

It will be understood, of course, that the invention is not limited to the structural details herein illustrated, but that numerous changes, modifications and the full use of equivalents may be resorted to without departure from the spirit or scope of the appended claims.

What I claim is:

1. In a speed selector, an hydraulically-actuated gear shifting mechanism, including a shiftable speed selector valve settable to cause the selection of predetermined speeds upon the application of pressure to said valve, means for delivering fluid pressure to said valve, a controller for said means and an actuator for said controller operated by the actuation of the speed selector after gear shifting thereof by said mechanism.

2. In a speed selector, an hydraulically-actuated gear shifting mechanism, including a shiftable speed selector valve settable to cause the selection of predetermined speeds upon the application of pressure to said valve, a constantly acting fluid pressure supply pump, means for delivering fluid therefrom to said valve, a controller for said means and an actuator for said controller operated by the actuation of the speed selector after gear shifting thereof by said mechanism.

3. In a speed selector, an hydraulically-actuated gear shifting mechanism, including a shiftable speed selector valve settable to cause the selection of predetermined speeds upon the application of pressure to said valve, a constantly acting fluid pressure supply pump, means for delivering fluid therefrom to said valve, a controller for said means and a pressure responsive actuator for said controller operated by the actuation of the speed selector after gear shifting thereof by said mechanism.

4. In a speed selector, an hydraulically-actuated gear shifting mechanism, including a shiftable speed selector valve settable to cause the selection of predetermined speeds upon the application of pressure to said valve, a constantly acting fluid pressure supply pump, means for controlling the admission of fluid under pressure from said pump to said selector valve and a controller for said means actuated in response to the rotation of the gears after the shifting thereof by said mechanism.

5. In a gear shifting mechanism, the combination with shiftable gears, and hydraulic means for shifting the gears, including a selector movable to various positions in order to select the gears which are to be shifted by fluid pressure, of a source of fluid under pressure, means for periodically delivering fluid under pressure from said source to said selector, said means including a control mechanism operable in response to the rotation of the gears.

6. In a gear shifting mechanism, the combination with shiftable gears, and hydraulic means for shifting the gears, including a selector movable to various positions in order to select the gears which are to be shifted by fluid pressure of a source of fluid under pressure, means for periodically delivering fluid under pressure from said source to said selector, said means including a pressure-responsive means actuated by the rotation of the gears.

7. In a gear shifting mechanism, the combination with shiftable gears, and hydraulic means for shifting the gears, including a selector movable to various positions in order to select the gears which are to be shifted by fluid pressure of a source of fluid under pressure, means for periodically delivering fluid under pressure from said source to said selector, said means including a pump operable upon rotation of the gears.

8. In a gear shifting mechanism, the combination with shiftable gears, and hydraulic means for shifting the gears, including a selector movable to various positions in order to select the gears which are to be shifted by fluid pressure of a source of fluid under pressure, means for periodically delivering fluid under pressure from said source to said selector, said means including a pump operable upon rotation of the gears, to preclude delivery of fluid under pressure to the selector upon rotation thereof.

9. In a fluid pressure supply system, the combination with a source of fluid pressure of a control mechanism therefor, including a pump, a compression chamber adapted to receive fluid under pressure from the pump, and a valve mounted in the pressure chamber and operable to control the delivery of fluid under pressure from the source in response to the operation of the pump.

10. A fluid pressure control system, including a source of fluid under pressure, a pair of delivery tubes therefrom, a valve for one of the tubes and a by-pass from the other tube connected with the valve for controlling the operation thereof, and means to vary the pressure of fluid in the by-pass.

11. A fluid pressure control system, including a source of fluid under pressure, a pair of delivery tubes therefrom, a valve for one of the tubes and a by-pass from the other tube connected with the valve for controlling the operation thereof, and a pump to vary the pressure of fluid in the by-pass.

12. A fluid pressure control system, including a source of fluid under pressure, a pair of delivery tubes therefrom, a valve for one of the tubes and a by-pass from the other tube connected with the valve for controlling the operation thereof, and a pump to vary the pressure of fluid in the by-pass, said valve including a pressure-responsive plunger actuated by fluid in the by-pass.

13. A machine tool headstock, including shafts and shiftable gears thereon, fluid pressure actuated means for shifting said gears, a selector for controlling the admission of fluid under pressure to said means, a pressure-responsive valve for controlling the delivery of fluid under pressure to the selector, and means, operable upon rotation of the gears, for exerting pressure on the pressure-responsive valve.

14. A machine tool headstock, including shafts and shiftable gears thereon, fluid pressure actuated means for shifting said gears, a selector for controlling the admission of fluid under pressure to said means, a pressure-responsive valve for controlling the delivery of fluid under pressure to the selector, and means, operable upon rotation of the gears, for exerting pressure on the pressure-responsive valve, said means including a fluid pressure by-pass and a pump driven by one of the shafts and discharging into the by-pass.

15. In a machine tool headstock, shiftable gears, fluid pressure means for shifting the gears, a selector operable upon application of fluid pressure thereto to direct fluid under pressure to selectively shift said gears, a source of power for the headstock, a main clutch between the source of power and the gears of the headstock, and means for delivering fluid under pressure to the selector in response to the actuation of the clutch.

16. In a machine tool headstock, shiftable gears, fluid pressure means for shifting the gears, a selector operable upon application of fluid pressure thereto to direct fluid under pressure to selectively shift said gears, a source of power for the headstock, a main clutch between the source of power and the gears of the headstock, and means for delivering fluid under pressure to the selector in response to the actuation of the clutch, said means including a gear pump operable by rotation of one of the shafts of the headstock.

17. In a machine tool headstock, shiftable gears, fluid pressure means for shifting the gears, a constant source of fluid pressure for lubrication and applicable for the shifting of the gears, a selector operable upon application of fluid pressure thereto to direct fluid under pressure to selectively shift said gears, a source of power for the headstock, a main clutch between the source of power and the gears of the headstock, and means for delivering fluid under pressure to the selector in response to the actuation of the clutch.

DUDLEY B. BULLARD.